United States Patent [19]

Hirose

[11] 4,015,895
[45] Apr. 5, 1977

[54] ZOOM LENS SYSTEM HAVING ENLARGED RANGE OF VARIATION IN MAGNIFICATION

[75] Inventor: Ryusho Hirose, Machida, Japan

[73] Assignee: Canon Kabushiki Kaisha, Tokyo, Japan

[22] Filed: Aug. 14, 1975

[21] Appl. No.: 604,484

Related U.S. Application Data

[63] Continuation of Ser. No. 432,204, Jan. 10, 1974, abandoned.

[30] Foreign Application Priority Data

Jan. 18, 1973 Japan .................. 48-8118

[52] U.S. Cl. ............ 350/183; 350/184; 350/212
[51] Int. Cl.² .............. G02B 15/02; G02B 15/14
[58] Field of Search ........ 350/184, 186, 212, 220, 350/183

[56] References Cited

UNITED STATES PATENTS 3,558,225  1/1971  Kirchoff ................ 350/184

3,751,136  8/1973  Kirchoff ................ 350/184

*Primary Examiner*—John K. Corbin
*Assistant Examiner*—Conrad Clark
*Attorney, Agent, or Firm*—Toren, McGeady and Stanger

[57] ABSTRACT

A zoom lens system wherein the distance between the rearmost lens surface in the afocal zooming lens portion and the foremost lens surface in the image forming lens system is kept unchanged and an afocal magnification varying lens is inserted into the above described distance so as to enlarge the telefoto range, the magnification varying lens consisting of a front convergent lens group and a rear divergent lens group. The requirements for the magnification varying lens are so set that compensation for aberrations is kept in superior condition when zooming is effected by the lens system with the magnification varying lens being eliminated therefrom, while, when zooming is effected under the condition the magnification varying lens is added to the lens system, the aberrations are also well compensated for.

1 Claim, 18 Drawing Figures

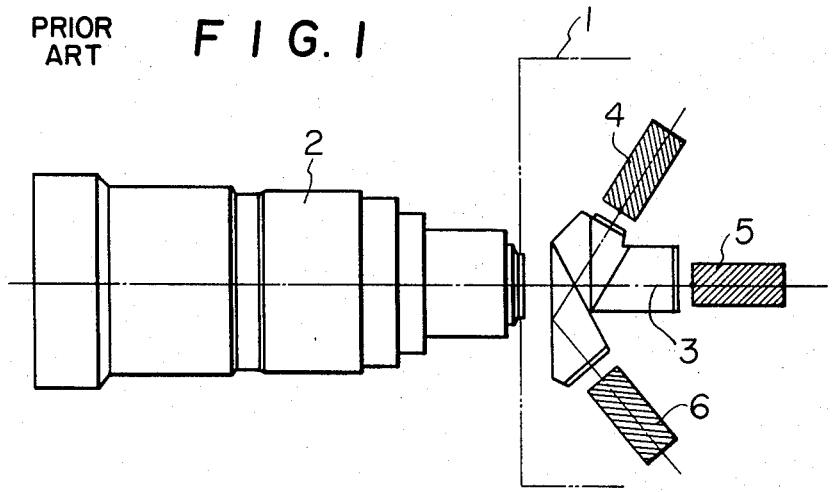
PRIOR ART FIG. 1
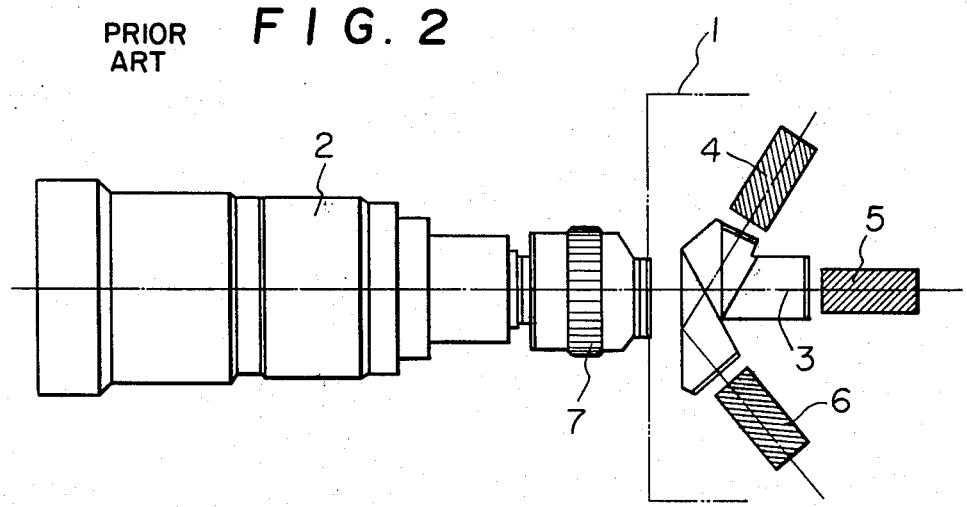
PRIOR ART FIG. 2

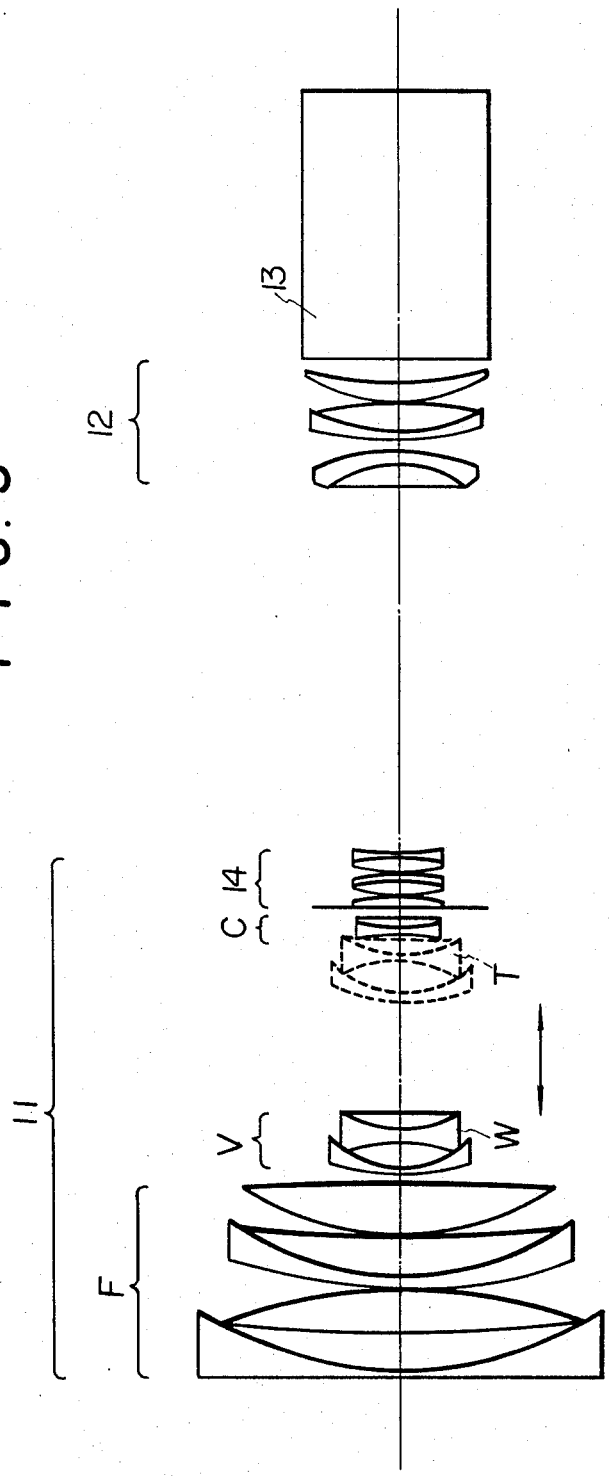

SPHERICAL ABERRATION

ASTIGMATISM

DISTORTION ABERRATION

SPHERICAL ABERRATION

ASTIGMATISM

DISTORTION ABERRATION

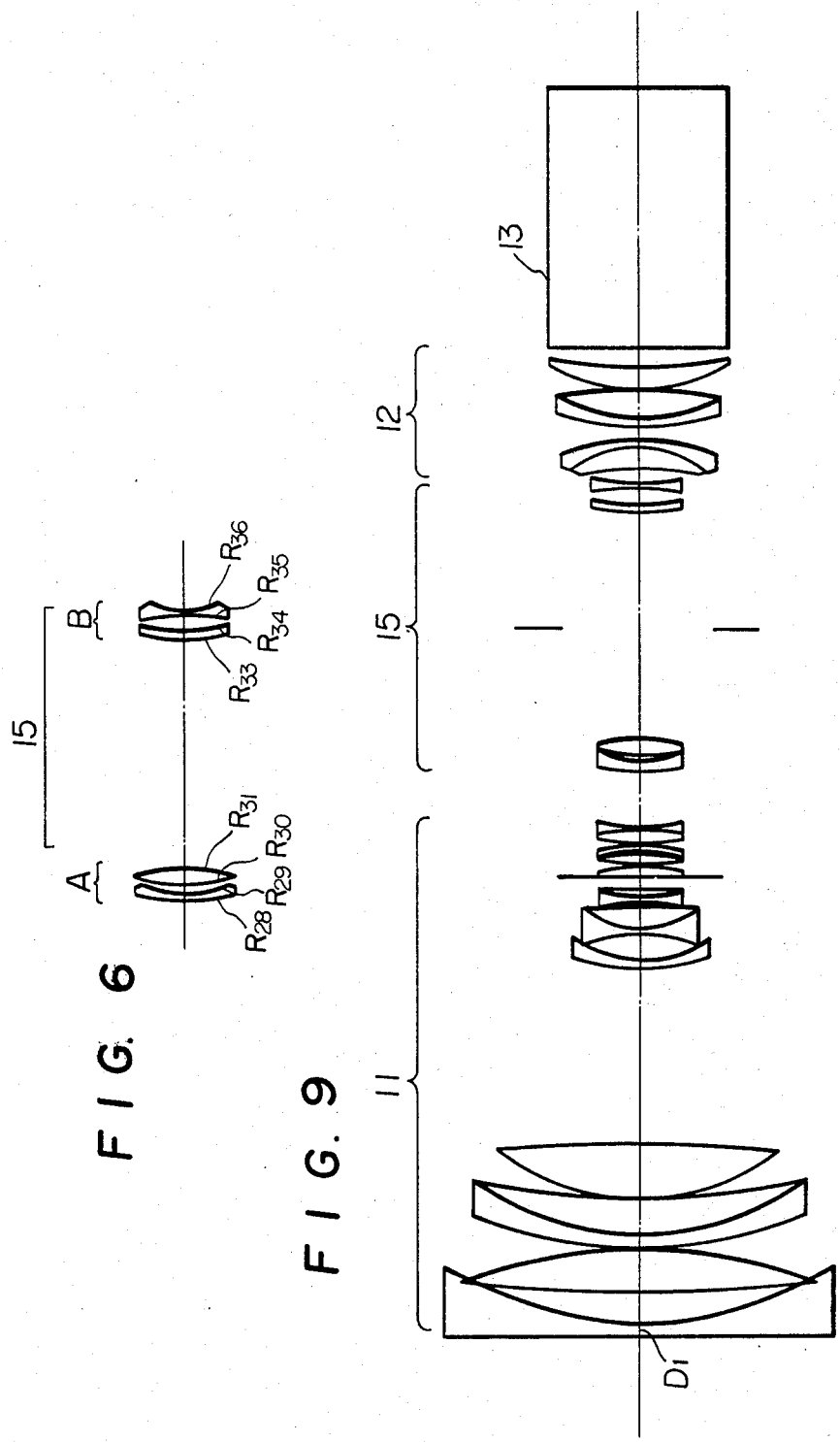

SPHERICAL ABERRATION

ASTIGMATISM

DISTORTION ABERRATION

SPHERICAL ABERRATION

ASTIGMATISM

DISTORTION ABERRATION

ZOOM LENS SYSTEM HAVING ENLARGED RANGE OF VARIATION IN MAGNIFICATION

This is a continuation of application Ser. No. 432,204 filed Jan. 10, 1974 now abandoned.

BACKGROUND OF THE INVENTION

The present invention relates to a zoom lens system in which compensation for aberrations is kept in superior condition when a lens group is added to or removed from a portion in the lens system for varying the magnification.

Heretofore, when the telefoto range is desired to be enlarged by extending the focal length of the main photographing lens, it has been conventional practice to utilize either a teleconvertor (afocal telefoto lens system) or an extender.

And, a lens system was well known as disclosed in U.S. Pat. No. 2,854,891 in which a teleconvertor is provided in front of the objective lens without having the zooming operation.

As a lens system used in a television camera, however, a zoom lens having the zooming ratio in the degree of 10× has been used as the standard lens system. Therefore, the diameter of the foremost lens element of the lens system will reach 100 – 150 mm and the weight of the lens system also amounts to more than 10 kg. The teleconvertor to be attached to such a zoom lens will have too large a lens element diameter and the weight of the lens system will be too great to be conveniently operated.

Therefore, an extender shown as 7 in FIG. 2 has been generally utilized in the viewpoint of easy manipulation as well as the size of the lens system. However, minor deterioration in the performance can not be avoided. Further, in the case of a color television camera, a prism optical system 3 for separation of three color channels of red, green and blue is provided in the camera body 1 behind the objective lens 2 at the back focus point thereof as shown in FIG. 1. Therefore, when it is desired to use the extender, it is necessary to detach the objective lens 2 from the camera body 1 as shown in FIG. 1 and to attached the extender 7 to the camera body 1 followed by the remounting of the objective lens 2 thereon as shown in FIG. 2.

In this case, if the flange backs of both the objective lens and the extender are exactly provided with sufficient accuracy, readjusting of focus will not be required. However, extremely high mechanical accuracy is required in the parts to achieve such a condition thereby making it impractical. Therefore, it is practically necessary to effect readjustment of focus or tracking for the respective camera pickup tubes 4, 5 and 6 for red, green and blue, and prolonged troublesome operation is required for remounting of the zoom lens, because the weight of the zoom lens as described above amounts to 10 kg.

SUMMARY OF THE INVENTION

The principal object of the present invention is to make it possible to insert a magnification varying lens into the distance provided between the zoom lens portion in the zoom lens system participating in the zooming action and the image forming lens system by extending such a distance and fixedly securing the zoom portion and the image forming lens system.

The second object is to make the compensation for aberrations superior when the zooming operation is effected under the condition the magnification varying lens is removed from the zoom lens system.

The third object is to make the compensation for aberrations superior when the zooming operation is effected under the condition the magnification varying lens is inserted into the zoom lens system so as to serve as a well known extender.

The fourth object is to eliminate the necessity for the tracking in the television camera, while the fifth object is to save troublesome labor for mounting a large size extender or a zoom lens.

BRIEF DESCRIPTION OF THE DRAWINGS

FIG. 1 is a schematic side view showing the arrangement of a conventional television camera;

FIG. 2 is a schematic side view showing a conventional extender mounted on a television camera;

FIG. 3 is a longitudinal sectional view showing the zoom lens system of an embodiment of the present invention set in the wide angle position and the telefoto position;

FIG. 6 is a longitudinal sectional view showing the magnification varying lens system used in relation to the embodiment of the present invention;

FIG. 9 is a longitudinal view showing the telefoto position of the zoom lens system of the present invention.

DETAILED DESCRIPTION OF THE PREFERRED EMBODIMENT

Figure 4A:
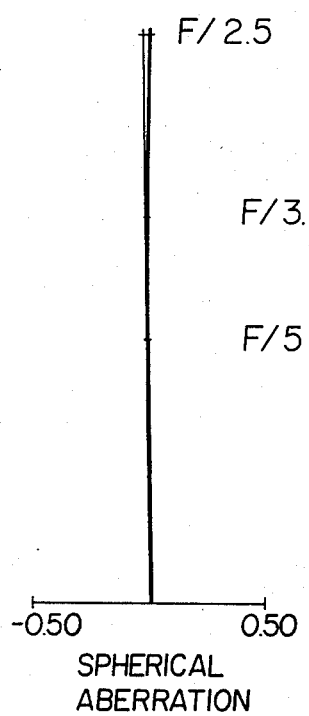
FIGS. 4A to 4C are diagrams showing the aberration compensation curves at the wide angle position of the zoom lens system of the present invention, respectively.

An embodiment of the present invention will be described with reference to FIG. 3.

In FIG. 3, 11 designates the zoom lens portion of an afocal system, the reference character W showing the position of variator V at the wide angle position of the zoom lens system, while the reference character T shows the position of the variator V at the telefoto position of the zoom lens system, C designating the compensator, F designating the focusing lens.

Figure 4B:
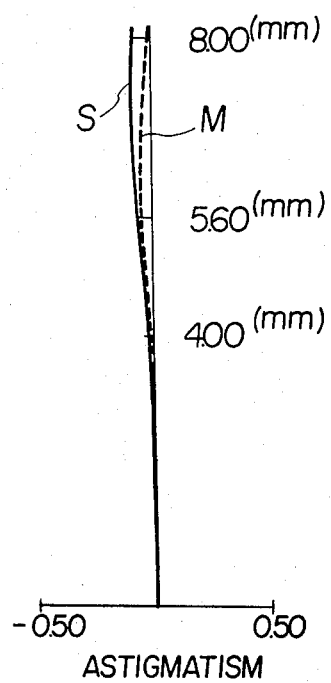
Figure 4C:
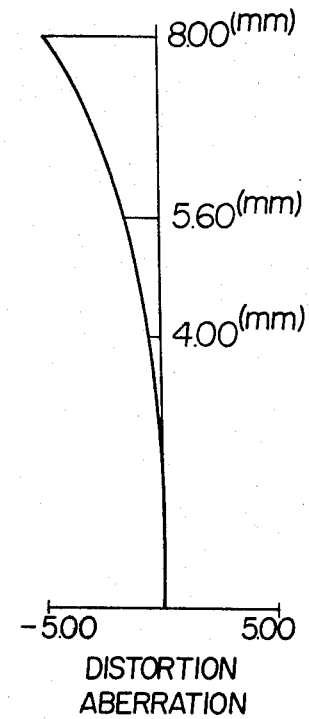
Figure 5A:
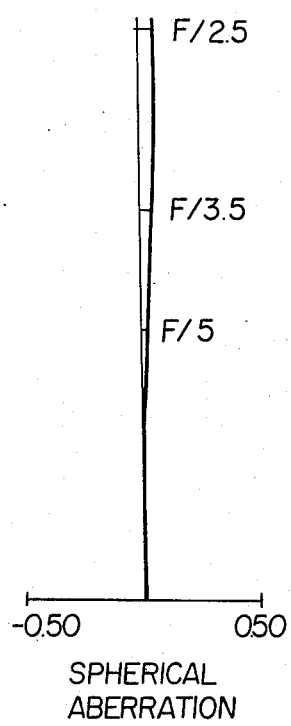
FIGS. 5A to 5C are diagrams showing the aberration compensation curves at the telefoto position of the zoom lens system of the present invention, respectively.
Figure 5B:
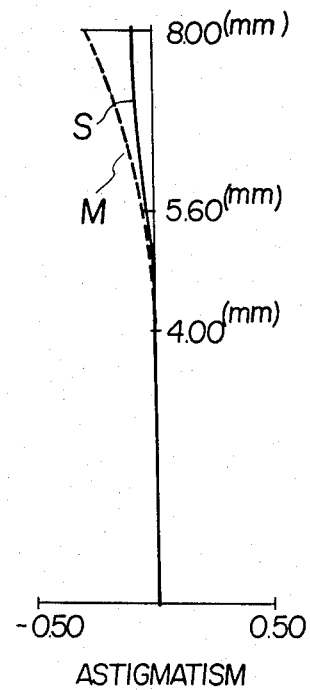
Figure 5C:
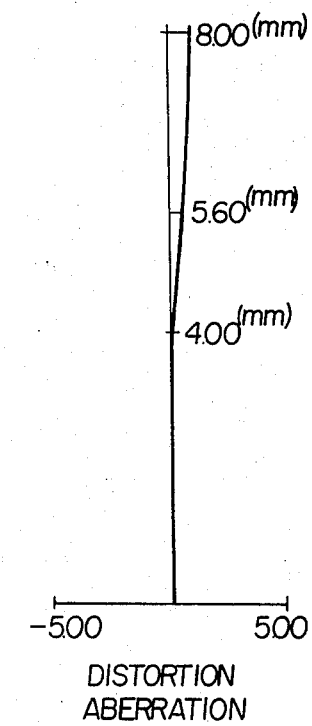

As shown by the aberration compensation curves in FIGS. 4A – 4C as well as FIGS. 5A – 5C, the aberrations are well compensated for at either of the wide angle position and the telefoto position of the zoom lens system.

Figure 7:
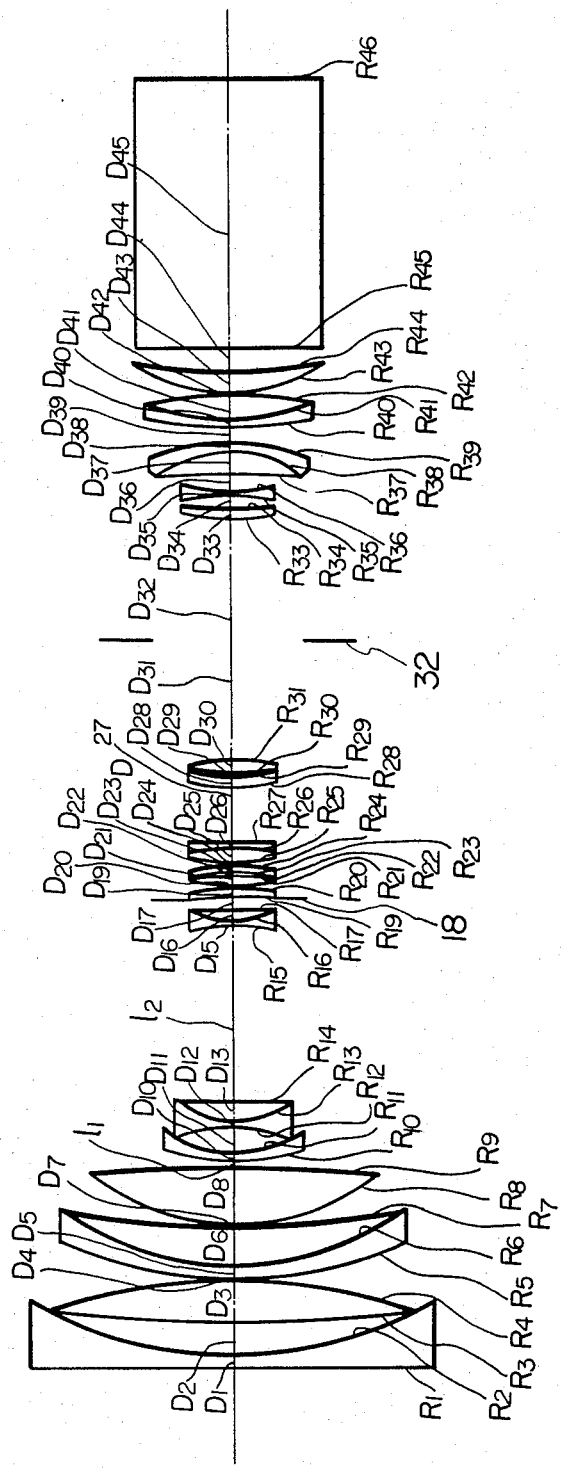
FIG. 7 is a longitudinal sectional view showing the wide angle position of the zoom lens system of the present invention wherein the magnification varying lens system is inserted therein.
Figure 8A:
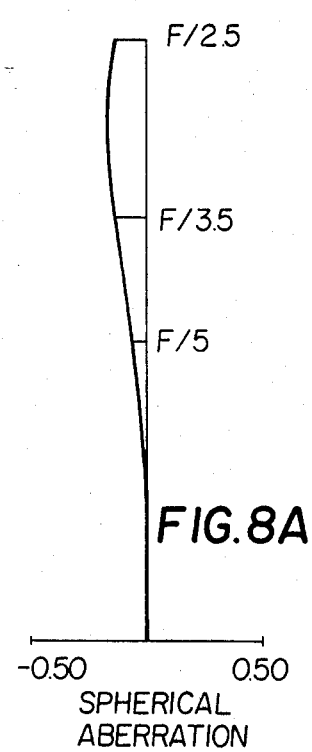
FIGS. 8A to 8C are diagrams showing the aberration compensation curves of the zoom lens system shown in FIG. 7, respectively.
Figure 8B:
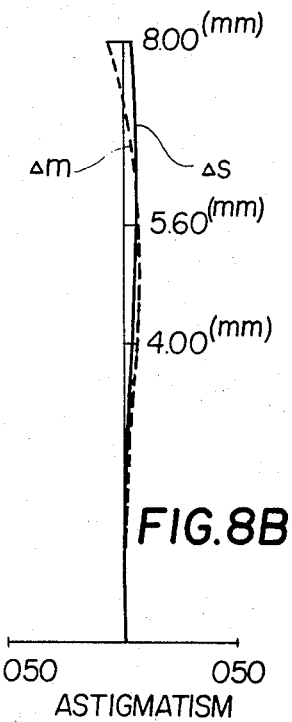
Figure 8C:
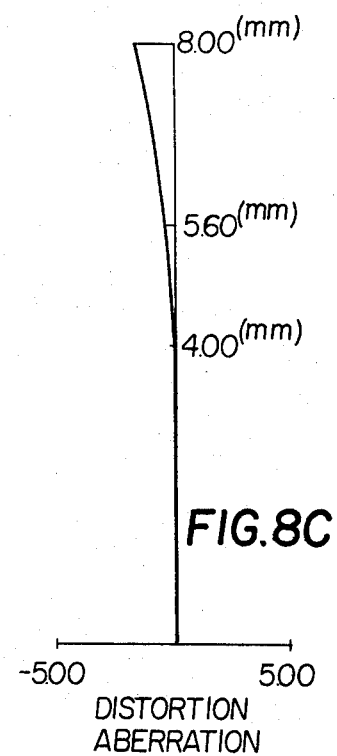
Figure 10A:
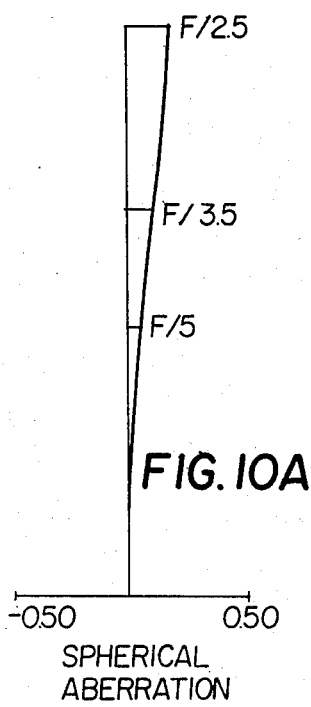
FIGS. 10A to 10C are diagrams showing the aberration compensation curves of the zoom lens system shown in FIG. 9, respectively.
Figure 10B:
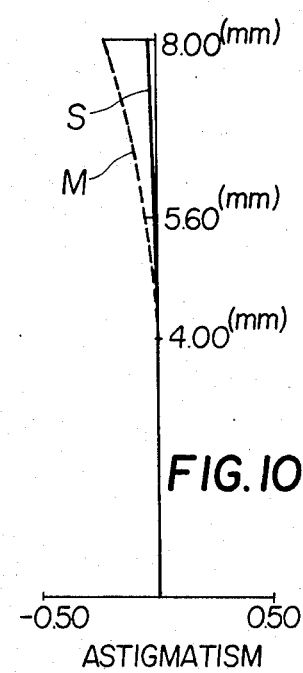
Figure 10C:
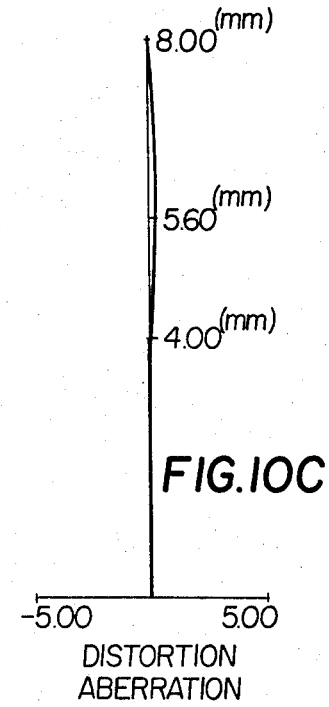

Further, a sufficient space is provided between a lens system 14 and the image forming lens system 12 which allows the removable insertion of a magnification lens system 15. Zoom lens portion 11, image forming lens system 12 and image forming lens system portion 13 are secured to portions of the lens system housing (not shown). Lens system 14 acts to make light passing through zoom lens portion 11 to be afocal. FIG. 3 shows the state of the lens system prior to the insertion of magnification varying lens 15. FIGS. 7 and 9 show the state of the lens system after lens 15 is inserted. Image aberration is not deteriorated by the insertion. FIG. 7 illustrates the state of the lens system in which variator V and compensator C are in a wide angle position while FIG. 9 illustrates the state in which they are at a telephoto position.

An afocal magnification varying lens 15 is shown in FIG. 6 which is comprised of A group forming a convex lens component and B group forming a concave lens component. And, when the magnification varying lens 15 is not inserted into the zoom lens system, the same is used as a conventional zoom lens with aberrations being compensated for as shown in FIG. 3, while, when the magnification varying lens 15 is inserted into the zoom lens system, the same is used as a wide angle lens (FIG 7.) and as a telefoto lens (FIG. 9) by extending the focal length so as to serve as the well known extender.

Conditions for achieving the function of the magnification varying lens shown in FIG. 6 will be described in detail hereinbelow. In the drawings, the magnification varying lens 15 includes A lens group arranged at the object side and B lens group, and must satisfy the following conditions:

$$f_1 > 0 \text{ and } f_2 < 0 \tag{1}$$

where:
$f$ is the focal length of A group while $f_2$ is the focal length of B group.

That is, if the above conditions (1) are not satisfied and either or both of the senses of the unequal signs are reversed, the magnification varying lens 15 acts as a wide angle convertor in relation to the image forming lens system 12 so that the focal length of the zoom lens system is shifted to the wide angle side. However, when the range of zooming is shifted by inserting the magnification varying lens into the zoom lens system, partial lack in the field of view will occur thereby rendering the zoom lens system to be unusable, because the zoom lens portion in the zoom lens system is kept unchanged regardless of inserting or removing the magnification varying lens into or out of the zoom lens system in view of the purpose of the present invention. Further, assuming that the range of zooming is shifted to the wide angle side, provision of a large aperture in the zoom lens system results in the necessity of providing wastefully large lens elements when the zoom lens system is used conventionally without the magnification varying lens, thereby making the zoom lens system to be inconvenient in use. Therefore, the conditions (1) are required.

Further, the zoom lens system of the present invention includes an afocal portion and the magnification varying lens satisfies the following conditions:

$$\begin{cases} \dfrac{|f_2|}{f_1} < 1 \\ \\ e = f_1 - |f_2| \end{cases} \tag{2}$$

where:
$e$ is the distance between the principal points of A group and B group of the magnification varying lens.

The above conditions are for rendering the magnification varying lens to be afocal. In the present invention, the zoom lens system includes the afocal portion and the magnification varying lens satisfying the above conditions (1), (2) is removably inserted into the lens system for rendering the magnification varying lens to be afocal and the image forming lens system. The reason why the above conditions (2) are required is as follows.

That is, the position of the image forming plane of the zoom lens system will coincide with the position of the image forming plane of the image forming lens system in the zoom lens system regardless of the fact that the afocal magnification varying lens 15 is inserted behind the afocal lens system 14 or removed therefrom. However, if the magnification varying lens is not afocal, the position of the image forming plane of the zoom lens system when the magnification varying lens is inserted into the zoom lens system will not coincide with that when the magnification varying lens is removed. Therefore, correction of the position of the image forming plane must be effected in order to serve as an extender, thereby making it impossible to achieve the object of the present invention. Thus, the conditions (2) are required.

Next, the zoom lens system of the present invention including the afocal portion satisfies the following condition:

$$a \cdot f_R \leq e' \tag{3}$$

where:
$a = 0.8$ when $$\left| \dfrac{f_1}{f_2} \right| > 1.5,$$

and
$a = 0.5$ when $$1 < \left| \dfrac{f_1}{f_2} \right| \leq 1.5$$

$f_R$ = the focal length of the image forming lens system
$e'$ = the distance between the rearmost lens surface of the zoom lens portion and the foremost lens surface of the image forming lens system.

And the value of $e'$ is greater than the total length of the magnification varying lens.

This condition is for insuring the required performance of the zoom lens system with aberrations being well compensated for, even though the magnification varying lens is inserted therein.

In other words, the total length of the magnification varying lens is limited by the distance $e'$ between the lens surfaces in the zoom lens system, and, if the condition (3) is not satisfied, the total length of the magnification varying lens is made shorter thereby resulting in an increased refractive power of the magnification varying lens under the conditions (1), (2), so that the Petzval sum is made to be negative thus deteriorating the image plane characteristics.

However, it is apparent that the above condition (3) will be affected by the magnification ratio ($f_1/f_2$) of the magnification varying lens. This is because the fact that, if $$\left|\frac{f_1}{f_2}\right| = 1,$$

for example, then the magnification of the magnification varying lens will be 1, and, if the refractive power of the convex lens group having the focal length $f_1$ is equal to that of the concave lens group having the focal length $f_2$, the Petzval sum will be cancelled. Therefore, the condition (3) will have to be satisfied depending upon the magnification of the magnification varying lens.

The compensation for aberrations of the zoom lens system without the magnification varying lens is kept unchanged in the usual case, and the zoom lens system is designed so as to give the most superior performance under the condition (3). The manner of compensation for aberrations of the magnification varying lens is different from that in the case of a conventional telefoto convertor or a conventional wide angle convertor. This is because the fact that, in the design of the telefoto or the wide angle convertor, the aberrations of the objective lens arranged behind the convertor are sufficiently compensated for and, therefore, it suffices to correct the aberrations of the convertor per se to low values, since no optical system is arranged in front of the convertor which will cause aberrations. Also, in the case of the extender, since the aberrations of the master objective lens arranged in front of the extender are sufficiently compensated for while no optical system is arranged behind the extender which will cause aberrations, it suffices to correct the aberrations of the extender per se to low values and effect compensation for aberrations in combination with the master objective lens.

To the contrary, in the present invention, optical systems having aberrations are arranged either in front of and behind the magnification varying lens. In other words, the zooming portion and the afocal lens portion included therein are arranged in front of the magnification varying lens, and the aberration occuring at the respective positions in the zooming operation is made low. That is, the respective aberrations are intentionally generated so as to reduce the variation in the aberrations caused by the zooming operation, therefore aberrations necessarily remain in the zoom lens portion. On the other hand, the image forming lens system located behind the magnification varying lens is rendered to have aberrations in reverse senses to those of the zoom lens portion so as to offset the aberrations generated in that zoom lens portion. Thus, optical systems having aberrations are arranged in front of and behind the magnification varying lens as described above, thereby making it very difficult to effect compensation for aberrations of the entire lens system when the magnification varying lens is added thereto. Therefore, it is made possible to achieve the role of an extender by determining the construction and configuration of the magnification varying lens under the following conditions in combination with the condition (3) as well as under the conditions (1), (2), so that the zoom lens system per se is used with the magnification varying lens added thereto. A group shown in FIG. 6 is further divided into convex, concave lenses or concave, convex lenses so that a convex lens component is formed as a whole, while B group consists of a convex lens located at the object side and a concave lens.

A group is determined so as to satisfy the following conditions:

$$\begin{cases} f_{11} < 0, f_{12} > 0 \\ \dfrac{|f_{11}|}{f_{12}} \geq 1.5, \text{ and} \\ R_{28}, R_{29} \geq 0 \end{cases} \quad (4)$$

where:
$f_{11}$ is the focal length of the concave lens forming A group, while $f_{12}$ is the focal length of the convex lens forming A group, and $R_{28}$ and $R_{29}$ are the radii of curvatures of the respective lenses.

The above conditions are for preventing the under correction of the spherical aberration generated by the zoom lens portion and the image forming lens system by the addition of the magnification varying lens and also for preventing the deterioration in coma by the addition of the magnification varying lens.

B group of the magnification varying lens includes a convex lens arranged at the object side and a concave lens, and satisfies the following conditions:

$$\begin{cases} f_{21} > 0, f_{22} < 0 \\ \dfrac{f_{21}}{|f_{22}|} \geq 2.5, \text{ and} \\ R_{35} < 0, R_{36} \geq 0 \end{cases} \quad (5)$$

where:
$f_{21}$ is the focal length of the convex lens forming B group, while $f_{22}$ is the focal length of the concave lens forming B group, and $R_{35}$, $R_{36}$ are the radii of the respective lenses.

That is, when the magnification varying lens is inserted into the zoom lens system with aberrations being well compensated for, the light bundle entering the image forming lens system is rendered to form an angle of field having a value reduced by the magnification of the magnification varying lens in comparison with the value occurring when the magnification varying lens is not added, thereby varying the positions of the light rays passing through the image forming lens system. Therefore, the astigmatism generated by the zoom lens portion when the magnification varying lens is added to the zoom lens system can not be compensated for by the image forming lens system. Thus, the compensation for astigmatism is made possible by providing the concave lens in the variable lens group located at a position most apert from the stop and satisfying the conditions (5).

By preparing the above described zoom lens system and the variable lens system, troublesome operation for attaching the zoom lens system having the weight of 10 kg or more to the extender is dispensed with, and, since the zoom lens portion and the magnification varying lens are both afocal systems, it is not necessary to readjust the tracking of the respective pickup tubes for red, green and blue colors of the color television camera without requiring any high accuracy in the mechanism, and, further, the zoom lens system of the present invention can be used conveniently, thereby affording various advantages.

Following is the numerical data relating to the embodiment of FIG. 7.

| NO | R | D | nd | rd |
|---|---|---|---|---|
| $R_1$ | −3462.80000 | 1.75000 | 1.80518 | 25.4 |
| $R_2$ | 66.07000 | 6.30000 | | |
| $R_3$ | 433.30000 | 6.57000 | 1.75700 | 47.9 |
| $R_4$ | −103.90000 | 0.12000 | | |
| $R_5$ | 95.71000 | 2.08000 | 1.78470 | 26.2 |
| $R_6$ | 48.37000 | 7.00000 | 1.48749 | 70.1 |
| $R_7$ | 214.60000 | 0.12000 | | |
| $R_8$ | 48.73000 | 8.61000 | 1.80610 | 40.8 |
| $R_9$ | −431.59963 | 11 | | |
| $R_{10}$ | 39.00000 | 0.99200 | 1.81600 | 46.8 |
| $R_{11}$ | 16.85000 | 4.85000 | | |
| $R_{12}$ | −26.71000 | 0.99200 | 1.77250 | 49.6 |
| $R_{13}$ | 14.97000 | 3.50000 | 1.80518 | 25.4 |
| $R_{14}$ | 3021.70571 | 12 | | |
| $R_{15}$ | −45.40000 | 0.73000 | 1.80610 | 40.8 |
| $R_{16}$ | 21.43600 | 2.04000 | 1.80518 | 25.4 |
| $R_{17}$ | 1149.16715 | 1.61895 | | |
| $R_{18}$ | ∞ | 0.30000 | | |
| $R_{19}$ | −63.76000 | 1.75000 | 2.60729 | 59.4 |
| $R_{20}$ | −66.76000 | 0.12000 | | |
| $R_{21}$ | 42.12263 | 1.75000 | 1.60729 | 59.4 |
| $R_{22}$ | −95.50000 | 0.87500 | | |
| $R_{23}$ | −23.05000 | 1.05000 | 1.80518 | 25.4 |
| $R_{24}$ | −28.35000 | 0.12000 | | |
| $R_{25}$ | 44.19000 | 2.33000 | 1.67000 | 57.4 |
| $R_{26}$ | −100.00000 | 0.87500 | 1.68893 | 31.1 |
| $R_{27}$ | 90.94000 | 9.71500 | | |
| $R_{28}$ | 39.69000 | 0.87500 | 1.80518 | 25.4 |
| $R_{29}$ | 25.65000 | 0.87500 | | |
| $R_{30}$ | 39.26000 | 2.33000 | 1.48749 | 70.1 |
| $R_{31}$ | −54.55423 | 20.18000 | | |
| $R_{32}$ | 0. | 21.54801 | | |
| $R_{33}$ | 38.37800 | 2.04000 | 1.71736 | 29.5 |
| $R_{34}$ | 70.82000 | 1.75000 | | |
| $R_{35}$ | −98.83000 | 0.87500 | 1.77250 | 49.6 |
| $R_{36}$ | 33.29168 | 2.50000 | | |
| $R_{37}$ | −92.97000 | 4.39000 | 1.62299 | 58.2 |
| $R_{38}$ | −18.70300 | 0.87000 | 1.80610 | 40.8 |
| $R_{39}$ | −45.66000 | 2.89000 | | |
| $R_{40}$ | 75.34200 | 0.70000 | 1.80518 | 25.4 |
| $R_{41}$ | 30.70000 | 4.75000 | 1.50137 | 56.4 |
| $R_{42}$ | −88.42400 | 0.12000 | | |
| $R_{43}$ | 26.71700 | 4.00000 | 1.65844 | 50.9 |
| $R_{44}$ | 70.47427 | 3.50000 | | |
| $R_{45}$ | ∞ | 45.00000 | 1.51633 | 64.1 |
| $R_{46}$ | ∞ | | | |

-continued

| NO | R | D | nd | rd |
|---|---|---|---|---|
| | Sum = 215.75692 | | | |

In the above table, R is the radius of curvature of the respective lens, D is the thickness of the respective lens or the distance between the surfaces of the adjacent two lenses, nd is the refractive index of the respective lens and $d$ is Abbe Number.

What is claimed is:

1. A zoom lens system having an enlarged range of variation in magnification, comprising:
an afocal zoom lens section, having a focusing lens group, a variator lens group, a compensator lens group and a fixed convergent lens group composed of a plurality of lens elements;
a diaphragm arranged between the compensator lens group and the fixed convergent lens groups;
a convergent image forming lens arranged apart and a certain length from the convergent lens group of the zoom lens section; and
an afocal extending assembly for changing image magnification composed of a front convergent group and a rear divergent group being axially apart from the front convergent group, said front convergent group and said rear divergent group being composed of a plurality of spherical lenses, said assembly being removably inserted between the convergent lens group of the zoom lens portion and the convergent image forming lens, said zoom lens system having an increased focal length when said assembly is inserted in comparison to the focal length of the zoom lens when said assembly is removed while maintaining the same image position, wherein said converging group in said afocal extending assembly is composed of a negative meniscus lens and an axially spaced positive lens, and wherein said divergent group is composed of a positive lens arranged at the object side and an axially spaced biconcave lens, whereby an image of equal quality is formed on the focal plane when the afocal extending assembly is mounted and dismounted.

* * * * *